United States Patent [19]

Reeder

[11] Patent Number: 4,495,895

[45] Date of Patent: Jan. 29, 1985

[54] LIVESTOCK FEEDER

[76] Inventor: Donald G. Reeder, R.R. #6, Box 120, Galesburg, Ill. 61401

[21] Appl. No.: 533,290

[22] Filed: Sep. 19, 1983

[51] Int. Cl.³ .............................................. A01K 5/02
[52] U.S. Cl. ............................. 119/52 AF; 119/56 R
[58] Field of Search ............. 119/51 R, 52 R, 52 AF, 119/52 B, 53, 56 R, 57; 222/265, 271, 273, 274

[56] References Cited

U.S. PATENT DOCUMENTS

| | | | |
|---|---|---|---|
| 564,929 | 7/1896 | Hollister | 119/56 R |
| 2,914,023 | 11/1959 | Pierre | 119/52 R |
| 3,105,463 | 10/1963 | Pilch | 119/52 AF |
| 3,171,385 | 3/1965 | Decker et al. | 119/51.11 |
| 3,330,255 | 7/1967 | Scott et al. | 119/52 AF |
| 3,504,654 | 4/1970 | Geerlings et al. | 119/56 R |
| 3,565,563 | 2/1971 | Radach | 119/56 R |
| 3,990,402 | 11/1976 | Eriksson | 119/56 R |
| 4,154,376 | 5/1979 | Jones | 119/52 B X |
| 4,337,728 | 7/1982 | Van Gilst et al. | 119/51 R |

Primary Examiner—Robert Peshock
Assistant Examiner—Kris R. Schulze
Attorney, Agent, or Firm—Henderson & Sturm

[57] ABSTRACT

A livestock and like feeder of the type in which a horizontal trough drops feed material into the tops of a plurality of vertical drop tubes, each tube being provided with a metering device for intercepting and subsequently dropping a predetermined amount of feed to a lower trough or the floor, etc., for animal consumption. The improvement resides in improved metering elements, each comprising a partial cylindrical member in each drop tube, dimensions to fit the drop tube in intersection fashion on a horizontal axis and configured with an upwardly facing pocket sized to receive the predetermined amount of feed. The member is invertible by rotation on the horizontal axis to dump the amount of feed while presenting a part-cylindrical portion of its surface upwardly to temporarily prevent additional dispensing until the member is turned back to receive a further and like amount of feed.

3 Claims, 10 Drawing Figures

LIVESTOCK FEEDER

BACKGROUND AND SUMMARY OF THE INVENTION

A typical livestock feeder of one known design includes an elongated trough or tube in which a conveyor, usually an auger, moves feed lengthwise of the bottom of the trough so that feed drops through longitudinally spaced-apart openings in the bottom of the trough into vertically placed drop tubes and hence to feeder means at the bottoms of the drop tubes. The feeder means may be a lower trough or simply the floor from which the animals eat.

Feed may be dropped unimpeded into a large hopper until it fills to the level of the bottom of the drop tube, the drop tube then fills until fill, thus allowing feed to be conveyed past the first drop tube to the next. This filling process continues until the last hopper is full. The animals are then allowed to consume feed at will. In at least one instance, as in the U.S. Pat. No. 4,337,728 to Van Gilst, the drop tubes are allowed to fill and the animals are allowed to eat at will for a timed interval, then a vertically shiftable conical valve is closed at the bottom of the drop tube preventing feed from flowing and providing a period of fast. There are usually two or three periods of at will feeding followed by periods of fasting daily.

In another instance (U.S. Pat. No. 3,504,654 to Geerlings) each valve is in the form of a manually operated, arcuate gate. The U.S. Pat. No. 2,714,023 to St. Pierre shows another form of gate valve, while the U.S. Pat. No. 4,154,376 to Jones discloses a shiftable plate or shutter.

It is not enough to periodically release a measured amount of material in each drop tube, but it is necessary to block the drop tube against delivery of more than the predetermined amount, it being realized that the drop tube may contain more than the desired amount stored above the valve. Hence, this device must be capable of blocking the material in excess of the measured amount. This result is achieved, according to the present invention, by a basically cylindrical member or element, one in each drop tube. Each element intersects its drop tube on a horizontal axis and the general cylindrical nature of the element is interrupted to provide a pocket or recess dimensioned to hold the predetermined amount of feed. Each element initially faces upwardly to receive this amount while an amount in excess of the desired amount is stored above the element in the drop tube. The element is inverted by being rotatable about its axis so that the pocket, facing downwardly, dumps the measured amount to fall down the drop tube while the cylindrical, unpocketed surface of the element faces upwardly to cut off and block further gravitational flow of material. The basic diameter of the element is substantially equal to the inside diameter of the drop tube.

A further feature is that the elements are coaxial on the horizontal axis and are interconnected by means enabling inversion and re-inversion of the elements in unison. In one form of the invention, the elements are seaprate from each other but joined by a shaft. In another form, the elements are parts of an elongated cylindrical tube, the walls of which are interrupted at spaced intervals, according to the spacing of the drop tubes, to provide the pockets.

It is also a feature of the invention to provide a simplified design leading to a low-cost, long-lived construction, one that is easy to operate and maintain.

Still further features and advantages will appear as preferred embodiments of the invention are disclosed herein.

DETAILED DESCRIPTION OF PREFERRED EMBODIMENTS

Figure 1:
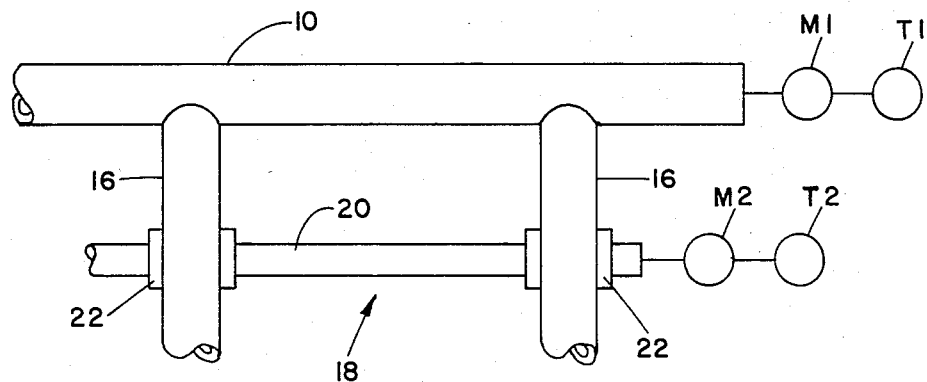
FIG. 1 is a small-scale elevation, with portions omitted to conserve space, of one form of the invention.
Figure 2:
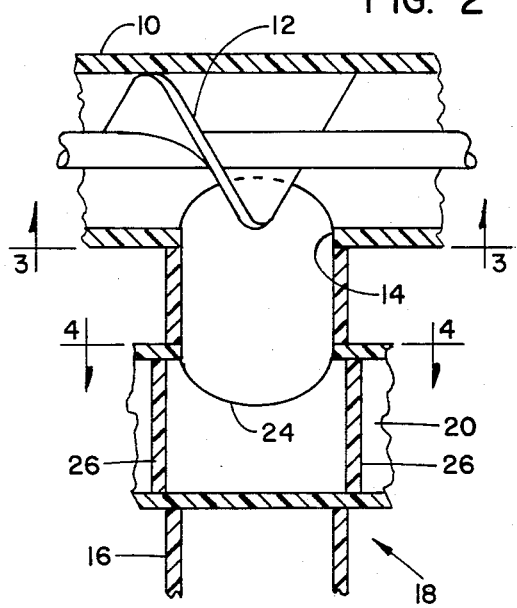
FIG. 2 is a fragmentary sectional view, on an enlarged scale, showing the relationship among the upper trough, a drop tube and a metering element.
Figure 3:
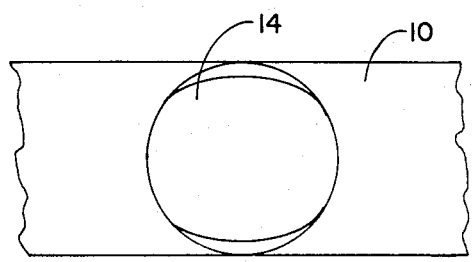
FIg. 3 is a section as seen along the line 3—3 of FIG. 2.
Figure 4:
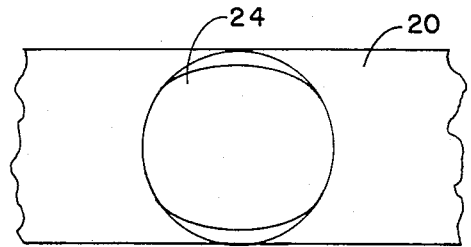
FIG. 4 is a section as seen along the line 4—4 of FIG. 1.

FIG. 1 illustrates rather generally a structure based on known systems, except for the improvement provided according to the present invention. An upper conveyor, typically in the form of a horizontal elongated tube (10) contains any suitable form of material-advancing or conveying means, such as an auger (12) (FIG. 2). The auger may be driven in any suitable manner, as by an electric motor (M1) under the control of means such as a timer or fill switch (T1). The output speed of the motor may be chosen according to the rate of delivery of feed material lengthwise of the upper tube bottom in which are provided a plurality of spaced-apart openings (14) leading respectively to drop tubes (16). As is conventional, the tubes (16) are cylindrical in section. The main tube (10) is disposed at some height above a floor or series of ultimate feeding stations (not shown) and the drop tubes deliver gravitionally to whatever feed area is used, the details of which are not significant here.

Were it not for some means of restricting the drop tubes, feed material delivered lengthwise of the upper tube (10) would simply drop into the first drop tube exclusvely of the other drop tubes. As outlined herein earlier, several forms of restricting or valve means are known. According to the present invention, metering is provided by metering means, designated generally at (18). In the form of the invention shown in FIG. 1-4, this means is a cylindrical tube (20) disposed horizontally and intersecting the drop tubes, being of an outside diameter on the order of the inside diameter of the drop tube so as to fit somewhat snugly but relatively rotatable. Any appropriate bearing means, as at (22), may be provided for this purpose. Here again, precise details are not significant. Periodic rotation of the metering tube (20) is effected by, for example, an electric motor (M2) controlled by a timer (T2), speed of rotation and duration of drive being selected according to a predetermined feeding schedule; for example, amounts, time between feed delivery, etc., all within the expertise of those skilled in the art.

As initially positioned in and with respect to the drop tubes, the metering tube is arranged to receive predetermined amounts of feed from the drop tubes, for which purpose the metering tube is provided with openings (24) spaced apart so as to register respectively with the drop tubes. Other than these openings, the metering tube has its cylindrical wall intact, the wall structure being interrupted only to provide these openings. Thus, when the metering tube is disposed as seen in FIG. 2, the openings (24) face upwardly or in positions to provide pockets in the tube for receiving feed material respectively from the drop tubes as the drop tubes in turn receive from the upper tube (10). Depending upon the settings of the controls, such as time, material will continue to be delivered along the upper tube bottom and the drop tubes and the respective registering portions of the metering tube will accumulate material. Partitions (26) may be used in the metering tube to compartmentalize the material receiving areas thereof. When the scheduled settings have been achieved, drive to the upper feed tube may or may not be discontinued, according to design, but motor (T2) is activated to turn the metering tube a half turn about its horizontal axis, now presenting the openings (24) downwardly and imperforate wall portions upwardly, the openings dropping their accumulated material to the lower parts of the drop tubes and ultimately to the feed stations (not shown), while the wall portions, facing upwardly, block further receipt of material by the metering tube from the drop tubes; in other words, the arcuate wall portions act as valves cutting of further gravitational delivery from above to the metering tube. Again, depending upon scheduling, etc., the motor (M2) is activated to return the metering tube to its FIG. 2 position and so on, repeating metering tube rotation if desired, etc.

Figure 5:
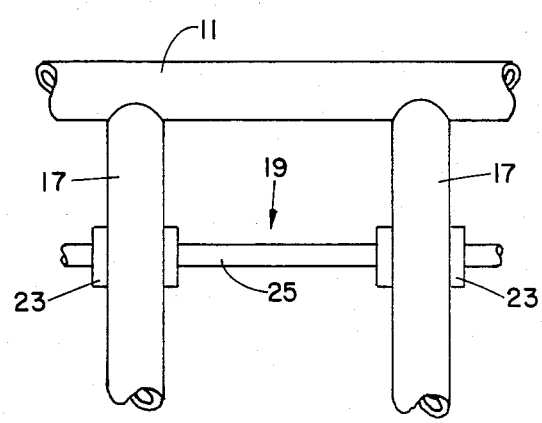
FIG. 5 is a view similar to FIG. 1 but showing a second form of the invention.
Figure 6:
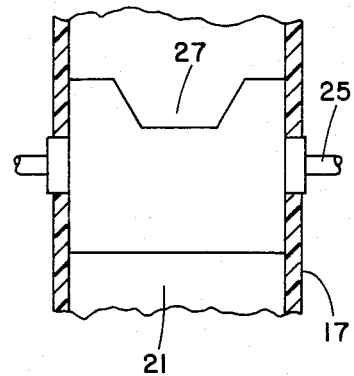
FIG. 6 is an enlarged, fragmentary sectional view, showing the relationship of the second form of metering element to its drop tube.
Figure 7:
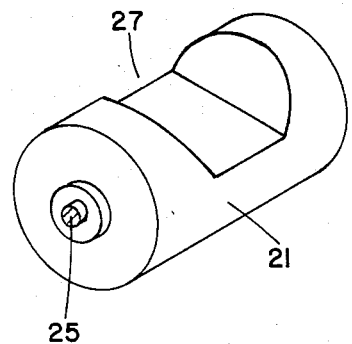
FIG. 7 is a perspective of the second form of metering element.

In the form of the invention shown in FIGS. 5-7, the same general principles are involved, including an upper conveying manes (11), drop tubes (17) and meterng means (19). The mechanism and structure of the tube (11) may be the same as that of the tube (10), having an interior auger (not shown) for advancing material to the drop tubes (17). In this instance, the metering means (19) is made up of a plurality of horizontally coaxial metering elements (21) journaled at (23) in the respective drop tubes and interconnected by a shaft (25) for turning the elements in unison, as by a motor like that at (M2). Each element may be solid, for example, but having a portion of its cylindrical exterior cut out to form a pocket (27), similar to the pocket provided in the metering tube (20) by the opening (24) and partitions (26).

In the operation of the system of FIGS. 5-7, the metering means (10) occupies a position with the pockets (27) upwardly so as to receive from the respective drop tubes. As before, according to schedule, rotation of the means (19) dumps the pockets and blocks further delivery of material to the metering means as the solid portions of the members (21) face upwardly. The sizes and number of the pockets may be selected according to the amounts of material to be fed, etc.

Figure 8:
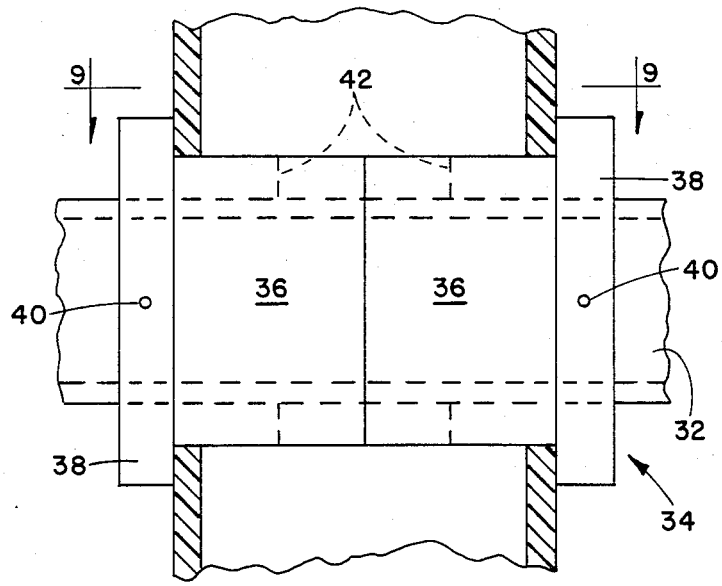
FIG. 8 is a sectional view of a further modified form of the invention.
Figure 9:
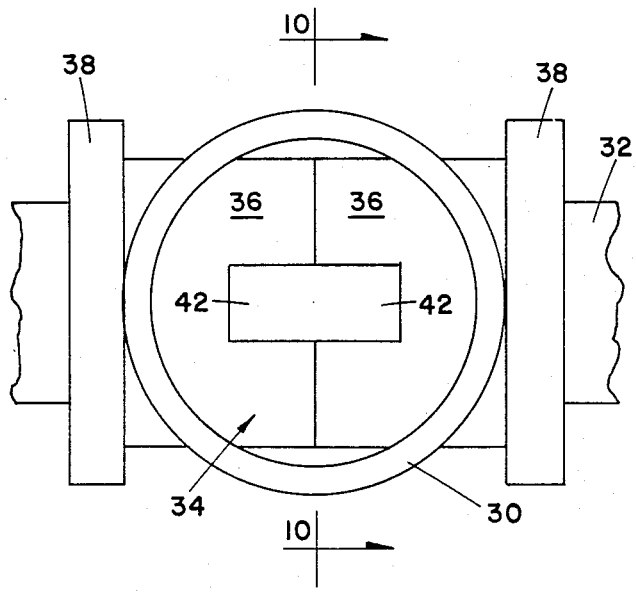
FIG. 9 is a section as seen on the line 9—9 of FIG. 8.
Figure 10:
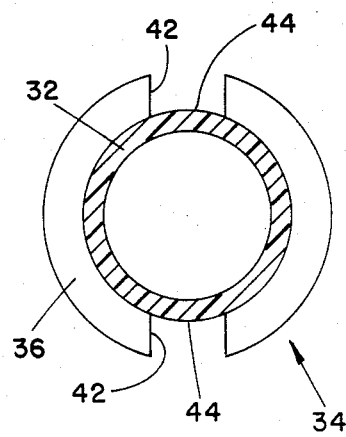
FIG. 10 is a section as seen along the line 10—10 of FIG. 9, with the drop tube omitted.

Another form of the invention is shown in FIGS. 8, 9 and 10, wherein a drop tube (30), which may be similar to those described above, is one of a series associated with upper delivery conveyors. Only one of the modified forms is being shown as representative of several usually employed in a complete system. A shaft (32), here of tubular section, intersects the drop tube as above described and carries a metering element denoted in its entirety by the number (34). This element comprises two similar members (36) of tubular section disposed coaxially on the shaft in abutting end-to-end relationship, the abutting ends lying midway of the diameter of the drop tube, and the outer end of each member has an integral annular flange (38). These flanges engage diametrically opposite portions of the drop tube and are pinned or otherwise fixed to the cross shaft as at (40) to confine the element against axial shifting relative to the cross shaft. The members are preferably made of a material that is corrosion- and abrasion-resistant and that also provides a suitable bearing for journaling the element in the drop tube.

A feature of this phase of the invention is that each member has a recess or pocket (42) at its end that abuts the complementary end of the other member, the recesses being alined to combine to provide a feed-receiving pocket as before. Since the members are hollow or tubular and since the recesses extend completely through the walls of the members, the adjacent shaft portion, as at (44), forms the bottoms of the recesses. In this particular form of the invention, the recesses are duplicated diametrically opposite those just described. If desired, the number and sizes of the recesses may be varied according to requirements, etc.

An arrangement of any of the types disclosed here lends itself admirably to feeding systems that apportion the feed to the animals in small increments at frequent intervals over longer periods, thus minimizing waste of the feed and improving the well-being of the animals, especially pigs.

It will be seen from the foregoing that improved but simplified means have been provided for metering feed material for livestock. Either form of the invention may be inexpensively manufactured and assembled and requires little maintenance. Features and objects not specifically set forth will occur to those skilled in the art, as will many variations and modifications in the preferred embodiments disclosed here.

I claim:

1. A livestock feeder having an elongated horizontal housing including means for moving feed material lengthwise thereof, said housing having a bottom provided with a plurality of feed openings spaced apart lengthwise the bottom and through which feed material is dropped, a plurality of similar, cylindrical, vertical drop tubes equal in number to the openings and arranged to receive material gravitationally respectively from the openings, and metering means for intercepting and then gravitationally dispensing predetermined amounts of material through the drop tubes, characterized in that the metering means comprises a plurality of elements, one for each drop tube, said elements being disposed below the housing and journaled respectively in the drop tubes on a common horizontal axis intersecting the drop tubes, each element being basically cylindrical about the horizontal axis and of a diameter equal to the inside diameter of a drop tube, the cylindrical nature of each element being interrupted to provide a pocket initially facing upward to receive material from above, each element being invertible about said horizontal axis to dump received material downwardly into its drop tube while presenting an uninterrupted portion of its surface upwardly to temporarily prevent further receipt of material by the element until the element is re-inverted, said elements being separate from each other and arranged initially with all pockets facing upwardly, and shaft means coaxially interconnecting the elements, each element further comprising a pair of complementary cylindrical members coaxially disposed and fixed to the shaft in abutting end-to-end relationship to each other, each member having a recess therein at its end abutting the other member, the recesses being alined to combine to provide the pockets.

2. The feeder of claim 1, further characterized in that each member has an annular flange external to the drop tube and engaging the drop tube to confine the members against axial shifting relative to the drop tube.

3. The feeder of claim 1, further characterized in that each member is tubular and its recess opens inwardly to the shaft so that the outer surface of the shaft forms the bottom of the recess.

* * * * *